United States Patent [19]
Cohen et al.

[11] Patent Number: 5,692,152
[45] Date of Patent: Nov. 25, 1997

[54] MASTER-SLAVE CACHE SYSTEM WITH DE-COUPLED DATA AND TAG PIPELINES AND LOOP-BACK

[75] Inventors: Earl T. Cohen, Fremont; Jay C. Pattin, Redwood City, both of Calif.

[73] Assignee: Exponential Technology, Inc., San Jose, Calif.

[21] Appl. No.: 649,115

[22] Filed: May 14, 1996

Related U.S. Application Data

[63] Continuation-in-part of Ser. No. 267,658, Jun. 29, 1994, Pat. No. 5,551,001.

[51] Int. Cl.$^6$ .................................................. G06F 12/08
[52] U.S. Cl. ..................... 395/467; 395/449; 395/473; 395/472; 395/450
[58] Field of Search ........................ 395/449, 467, 395/473, 450, 472, 455

[56] References Cited

U.S. PATENT DOCUMENTS

| | | | |
|---|---|---|---|
| 4,467,414 | 8/1984 | Akagi et al. | 395/250 |
| 4,707,784 | 11/1987 | Ryan et al. | 395/467 |
| 4,860,192 | 8/1989 | Sachs et al. | 395/403 |
| 5,019,971 | 5/1991 | Lefsky et al. | 395/250 |
| 5,023,776 | 6/1991 | Gregor | 395/449 |
| 5,025,366 | 6/1991 | Baror | 395/455 |
| 5,123,097 | 6/1992 | Joyce et al. | 395/394 |
| 5,131,088 | 7/1992 | Blasco et al. | 395/425 |
| 5,136,700 | 8/1992 | Thacker | 395/449 |
| 5,155,824 | 10/1992 | Edenfield et al. | 395/470 |
| 5,155,828 | 10/1992 | Le Fetra et al. | 395/449 |
| 5,155,831 | 10/1992 | Emma et al. | 395/448 |
| 5,170,476 | 12/1992 | Laakso et al. | 395/467 |
| 5,179,679 | 1/1993 | Shoemaker | 395/445 |
| 5,201,041 | 4/1993 | Bohner et al. | 395/465 |
| 5,202,969 | 4/1993 | Sato et al. | 395/470 |
| 5,212,781 | 5/1993 | Shah | 395/449 |
| 5,249,282 | 9/1993 | Segers | 395/449 |
| 5,276,848 | 1/1994 | Gallagher et al. | 395/448 |
| 5,283,890 | 2/1994 | Petolino et al. | 395/449 |
| 5,293,603 | 3/1994 | MacWilliams et al. | 395/309 |
| 5,307,477 | 4/1994 | Taylor et al. | 395/403 |
| 5,339,399 | 8/1994 | Lee et al. | 395/473 |
| 5,355,467 | 10/1994 | MacWilliams et al. | 395/473 |
| 5,359,723 | 10/1994 | Mathews et al. | 395/449 |
| 5,479,641 | 12/1995 | Nadir et al. | 395/455 |

*Primary Examiner*—Tod R. Swann
*Assistant Examiner*—J. Peikari
*Attorney, Agent, or Firm*—Stuart T. Auvinen

[57] ABSTRACT

A cache system has a large master cache and smaller slave caches. The slave caches are coupled to the processor's pipelines and are kept small and simple to increase their speed. The master cache is set-associative and performs many of the complex cache management operations for the slave caches, freeing the slaves of these bandwidth-robbing duties. The master cache has a tag pipeline for accessing the tag RAM array, and a data pipeline for accessing the data RAM array. The tag pipeline is optimized for fast access of the tag RAM array, while the data pipeline is optimized for overall data transfer bandwidth. The tag pipeline and the data pipeline are bound together for retrieving the first sub-line of a new miss from the slave cache. Subsequent sub-lines only use the data pipeline, freeing the tag pipeline for other operations. Bus snoops and cache management operations can use just the tag pipeline without impacting data bandwidth. Loop-back flows are performed which cancel an intervening flow in the tag pipeline when the index portions of the addresses match.

19 Claims, 6 Drawing Sheets

MASTER-SLAVE CACHE SYSTEM WITH DE-COUPLED DATA AND TAG PIPELINES AND LOOP-BACK

BACKGROUND OF THE INVENTION—RELATED APPLICATIONS

This is a continuation-in-part (CIP) of "Master-Slave Cache System", Ser. No. 08/267,658, filed Jun. 29, 1994 now U.S. Pat. No. 5,551,001, hereby incorporated by reference. This application is also related to "A Slave Cache Having Sub-Line Valid Bits Updated by a Master Cache", U.S. Ser. No. 08/618,637, filed Mar. 19, 1996, and assigned to the same assignee.

BACKGROUND OF THE INVENTION—FIELD OF THE INVENTION

This invention relates to cache memory systems, and more particularly to a master-slave cache system having separate pipelines for accessing the tag and data arrays of the master cache.

BACKGROUND OF THE INVENTION—DESCRIPTION OF THE ELATED ART

On-chip caches are becoming more of a bottleneck to processor performance. They need to be larger and more complex because the off-chip miss penalty is becoming relatively higher. Processor technology allows for rapid increases in processor speed but off-chip memory access times have been unable to achieve commensurate speed increases. Larger, more complex caches are not as fast as smaller, simpler caches, and may not be able to match the processor's pipeline clock rate and maximum bandwidth.

A memory hierarchy is often set up, in which a few small registers lie within the microprocessor core. A small level-1 cache memory is placed on the microprocessor die, and a level-2 cache memory on the system board, with dynamic RAM (DRAM) comprising the large main memory. Maintaining coherency between each of these levels in the memory hierarchy can be difficult and can slow down the cache memories. Prefetching of instructions can also increase the complexity of the cache and slow down the cache.

The trend in recent years has been to put a level-1 cache on the microprocessor die. As the processor becomes faster, the level-1 cache size has been increased to increase the hit rate of the level-1 cache. A high hit rate is necessary because the miss penalty is high, requiring that a slower off-chip level-2 cache or main memory be accessed. Often the level-1 cache is made multi-way set-associative to improve its hit rate. This has led to larger and more complex on-chip caches. However, the larger and more complex the cache becomes, the more difficult it becomes to make the cache fast enough to meet the bandwidth of the processor pipelines The parent application disclosed a master-slave cache system where a large level-2 master cache controls smaller slave caches. The slave caches supply instructions and data to the processor at a high rate since the slave caches are small and simple. The master cache performs all cache management functions for the slave caches, such as snooping, line invalidation, and cache block zeroing. The master cache keeps line valid bits which indicate when a line is also present in one of the slave caches. In the other related application the master-slave cache is extended to include a pipeline in the master cache which keeps track of the sub-line valid bits in the slave caches. The master pipeline alters sub-line valid bits to reflect other transfers to the slave cache that are in progress. The slave cache then blindly writes the updated sub-line valid bits from the master cache's pipeline. Thus the slave cache does not have to generate and alter its sub-line valid bits, further simplifying and speeding up the slave cache.

The master cache's pipeline described in the related application used a single pipeline to access both the master cache's tags and data. A pipeline has multiple stages, and different actions occur in these stages. The tags are first accessed, and then the data is retrieved from the master cache before being sent to the slave cache. Using multiple stages allows for optimization of timing of these various actions such as accessing the cache memory.

While the master cache's pipeline frequently accesses both the tags and the data array of the master cache, many operations do not require access to both the tags and the data array. Line fills require that the master's tags be read once per line, but the data array is read four times per line (for a line having four sub-lines). Thus the data array is accessed much more often than the tags for line fills. The tags sit idle during three of the four sub-line transfers.

Cache management operations often do not require access to the data array. Bus snoops and invalidations merely have to read and possibly update the master's tags. The data array sits idle during bus snoops. Thus some cache operations do not access the data array while other operations access only the tag array. The resources of the master cache are not used efficiently since the master's pipeline often accesses just the tags or just the data array.

On the other hand, some systems must respond to external bus snoops within a fixed span of time. These systems sometimes include a second set of tags to respond quickly to bus snoops. A second set of 'snoop' tags certainly increases the cost of the cache.

A pipeline allows optimization of accesses. For the master cache, two different kinds of access are required: tag access and data-array access. Latency, the delay to read the tag, is most important for the tag array. Bandwidth, the amount of data transferred averaged over a period of time, is most important for optimizing the data array. Often the bandwidth of the data array must be less than optimal in order to minimize tag latency. Thus latency of tag access can impede data-array bandwidth when a single master-cache pipeline is used, or conversely, optimizing for data-array bandwidth can increase tag latency.

What is desired is efficient use of the tags and the data array of the master cache. It is desired to process line misses, stores, bus snoops, invalidates, and other cache operations in the master cache's pipeline as efficiently as possible. It is further desired to minimize tag access latency yet maximize data bandwidth without adding a second set of 'snoop' tags.

SUMMARY OF THE INVENTION

A master-slave cache system is accessed by a central processing unit's (CPU's) execution pipelines. A slave cache supplies instructions or operands to the CPU's execution pipelines. A master cache is coupled to the slave cache and is coupled to an external bus. The master cache is organized as an N-way set-associative cache with N elements for each index-portion of an address. The master cache has a tag RAM array for storing a tag and a master-valid indicator for each element for each index-portion of the address. The tag RAM array includes slave-valid indicators which identify elements in the tag RAM array which also have valid data in the slave cache. The master cache performs cache management operations for the slave cache by using the slave-valid indicators in the master cache.

A data RAM array stores sub-lines of data for each tag in the tag RAM array. A tag pipeline accesses the tag RAM array. The tag pipeline has a plurality of stages for simultaneously processing a plurality of requests by passing the requests through successive stages of the tag pipeline in response to a clock.

A data pipeline accesses the data RAM array independently of the tag pipeline. The data pipeline has a plurality of stages simultaneously processing a plurality of requests by passing the requests through successive stages of the data pipeline in response to the clock.

Tag arbitration means receives a plurality of tag requests. It selects a tag request from the plurality of tag requests for processing by the tag pipeline. Data arbitration means receives a plurality of data requests. It selects a data request from the plurality of data requests for processing by the data pipeline. The data arbitration means operates independently of the tag arbitration means.

Source registers are coupled to the tag arbitration means and to the data arbitration means. They store a plurality of requests for access to the master cache, including requests to access only the tag RAM array, requests to access only the data RAM array, and requests to access both arrays. The source registers store completion status for each request.

The tag pipeline includes tag update means, coupled to the source registers, for updating the completion status for the request being processed by the tag pipeline. The data pipeline includes data update means, coupled to the source registers, for updating the completion status for the request being processed by the data pipeline. Thus the tag RAM array is accessed separately and independently from the data RAM array because separate pipelines are used to access the tag RAM array and the data RAM array.

In further aspects of the invention the tag pipeline has tag compare means that is coupled to the tag RAM array. It compares a tag portion of the address of the tag request to a plurality of N tags for the N elements that have an index matching an index portion of the address of the tag request. A hit means is coupled to the tag compare means. It signals a hit when one of the plurality of N tags matches the tag portion of the address of the tag request. The tag update means further updates the completion status for the tag request with a hit indication when the hit is signaled by the hit means but updates the completion status with a miss indication when no hit is signaled. Thus the source registers are updated with the hit indication or the miss indication after the tag pipeline accesses the tag RAM array.

Still further aspects of the invention include element means which is coupled to the tag compare means. It identifies which one of the plurality of N tags for the N elements matches the tag portion of the address of the tag request and outputs an element-hit identifier to the tag update means. The tag update means writes the element-hit identifier to the tag request in the source registers. Thus the source registers identify which element contains a matching tag after the tag pipeline accesses the tag RAM array.

In other aspects a bus snoop register stores bus snoop requests from the external bus. The bus snoop requests include requests to invalidate any matching lines in the master cache. Thus slave-cache misses and bus snoops are requests stored in the source registers.

DETAILED DESCRIPTION

The present invention relates to an improvement in cache organization. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Master-Slave Cache Arrangement

The parent application for a "Master-Slave Cache System" U.S. Ser. No. 08/267,658, now U.S. Pat. No. 5,551,001, hereby incorporated by reference, first disclosed a master-slave cache arrangement. A large, set-associative master cache supplies instructions and operands to smaller direct-mapped slave caches for the processor's data and instruction pipelines. Complex logic for cache coherency, snooping, zeroing and invalidations is provided in the master cache but not in the slave caches. The master cache's tags include slave valid bits which indicate that a copy of the data is located in the slave cache. Data in the slave caches can be invalidated by the master cache if the master cache determines that the data also resides in a slave cache.

A master-slave cache on the same substrate or die with a microprocessor can supply the maximum bandwidth of the processor's pipelines while being large enough to have a low miss rate. The cache is arranged as a large master cache which controls two smaller slave caches, one slave instruction cache for supplying the instruction pipeline with instructions, and a second slave data cache for supplying data operands to the execution pipeline.

Figure 1:
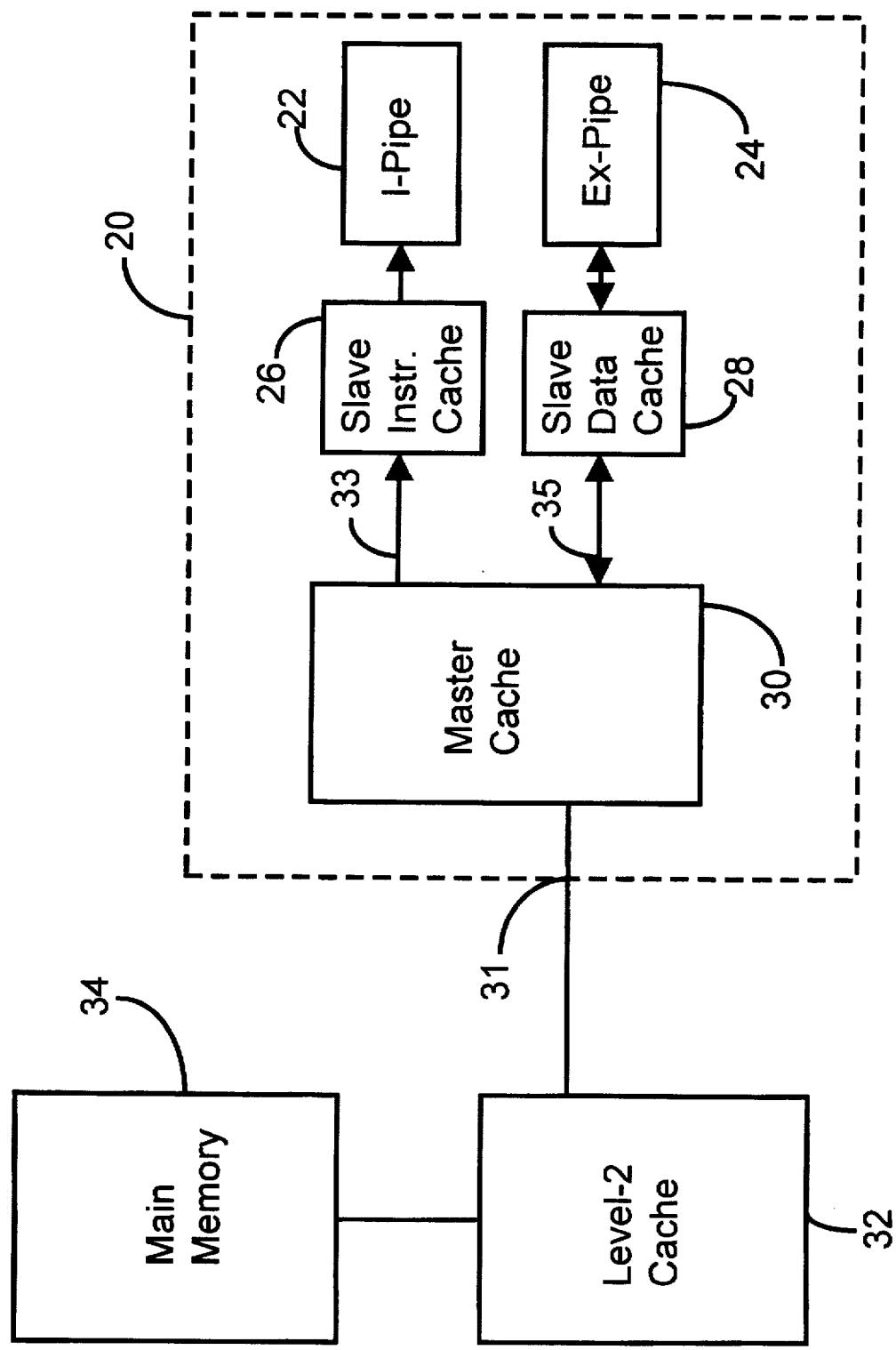
FIG. 1 illustrates a microprocessor substrate or die containing the master-slave cache.

FIG. 1 illustrates a microprocessor substrate or die 20 containing the master-slave cache. The central processing unit's (CPU's) instruction pipeline 22 is supplied with instructions by slave instruction cache 26. Instruction pipeline 22 is clocked by a processor or pipeline clock. The pipeline clock controls the transfer of instructions from one stage of the pipeline to the next. One or more instruction words must be provided for each processor clock period. Although the instruction pipeline 22 may stall, or occasionally require more than one processor clock period for an instruction word, the maximum or full bandwidth when no stalls occur is n instruction words per processor clock period, where n is the level of scalarity. Thus the slave instruction cache 26 must supply the instruction pipeline 22 with at least n instruction words per processor clock period if the full bandwidth of the processor is to be achieved. A super-scalar processor capable of executing 2 instructions per clock period has n=2.

The execution pipeline 24 is supplied with operands from slave data cache 28. In one embodiment of the invention execution pipeline 24 may also store data operands into slave data cache 28; these data operands are then written through to master cache 30. Master cache 30 provides all the cache management necessary for itself and the slave caches 26, 28. Slave caches 26, 28 need only have a valid bit with each tag which is set and cleared by the master cache 30. Prefetching, handling external snoop requests, coherency operations, and cache flushes are all accomplished by the master cache. Thus the slave caches 26, 28 may be kept simple, allowing for a fast access time and a high bandwidth. Master cache 30 is significantly larger and more complex than is possible if it were to directly supply the processor's pipelines 22, 24. Directly supplying the pipelines in a single processor clock requires a fast access time.

Slave caches 26, 28 are small, fast and simple, and are preferably implemented as RAM-based, direct-mapped caches, while master cache 30 is preferably RAM-based and set-associative. Master cache 30 preferably has four or more times the capacity of both the slave caches 26, 28. Master cache 30 may require multiple processor clock periods to access its contents, while the slave caches 26, 28 are small enough to supply the required data operand and instruction words each processor clock period.

An additional level-2 cache 32 may be provided on the system board off the microprocessor die 20, or the level-2 cache 32 may be omitted, and misses from the master cache passed on to the main memory 34 on the system board. The high-bandwidth benefit of the Harvard architecture is obtained because the slave instruction cache 26 and slave data cache 28 can supply both pipelines 22, 24 as do split instruction and data caches of the Harvard architecture. However, two sets of address and data busses and pins are not required.

The two caches must be made large so that the miss rate is small, otherwise the two caches will be contending for the multiplexed pins frequently, causing one cache to have to wait. However, the larger cache sizes reduce the clock rate and bandwidth that can be supplied to the processor core. The prior-art Harvard architecture is thus stuck between the trade-off of larger size and lower bandwidth, or smaller cache size and higher bandwidth but pin contention or die cost.

In the invention, master cache 30 provides more functionality than is the case by merely integrating an additional level of caching on the microprocessor die 20. Master cache 30 is tightly coupled to slave caches 26, 28 and can relieve the slave caches 26, 28 from burdensome cache management operations such as coherency and snooping. In the Harvard architecture, coherency between instruction cache and data cache is difficult and may consume clock cycles that otherwise would be used to supply the pipelines 22, 24. In the invention, the master cache 30 absorbs these coherency requests, freeing the slave caches to supply the processor's pipelines, and greatly simplifying the control logic for the slave caches.

Additionally, the slave caches 26, 28 may be physically located in close proximity to the pipelines 22, 24. Thus slave instruction cache 26 is located near to the instruction pipeline 22, while the slave data cache 28 is located near the execution pipeline 24. The larger master cache 30 may then be located at a greater distance from the pipelines 22, 24 and the core CPU logic. This simplifies floor-planning and layout of the microprocessor die 20, and results in faster access times for transferring instructions and data from the slave caches 26, 28 to the pipelines 22, 24. In prior-art systems, the large cache sizes required that any cache be located away from the CPU core and the pipelines.

Only a single set of address and data busses are needed for communicating with external caches and memories. Pins 31 connect the master cache 30 with the external level-2 cache 32, whereas on some prior-art systems a single set of pins had to be multiplexed. Not having to multiplex the pins reduces contention and complexity. A larger, wider data path may be used between the master cache 30 and the slave caches 26, 28 since no connection is necessary for the slave-master busses 33, 35 to the external pins of the microprocessor die 20. Slave-master busses 33, 35 may be each separately optimized for the bandwidth required by the particular slave cache and pipeline.

Since the bulk of the capacity of the cache lies in the master cache 30 rather than the slave caches 26, 28, the benefits of the unified cache result. A higher hit rate is achieved than if the master cache were split into two separate half-size caches, and the master cache provides flexibility and adaptability by being able to place either instruction or data words in any line in the cache, allowing the portion of the cache allocated to either data or instructions to vary as needed by the programs currently executing on the processor. The master cache may be implemented in slower, denser, and lower-power memory than the slave caches, saving power, space and cost while maintaining a high hit rate.

Master Tags Include Slave Valid Bits

Figure 2:
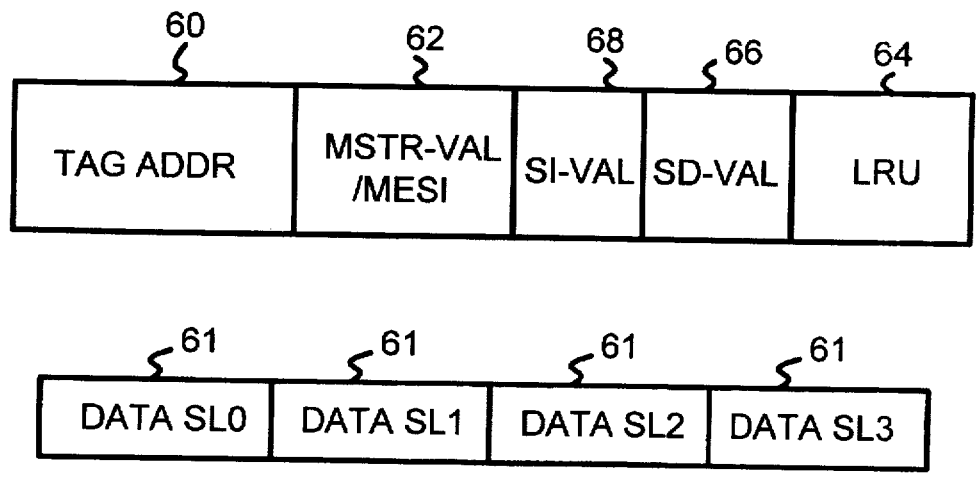
FIG. 2 shows the tags and data stored for each line in the master cache in a tag array and a separately-accessed data array.

FIG. 2 shows the tags and data stored for each line in the master cache in a tag array and a separately-accessed data array. A master line is stored for each line in the master cache 30. The master line is divided into two parts which are stored and accessed separately: data fields 61 are stored in a data RAM array, while tag 60, valid bits 62, 66, 68 and LRU bits 64 are stored in a tag RAM array. LRU bits 64 may also be stored in a separate 'use' array which may be accessed with the tag RAM array.

Data fields 61 of the line are well-known in the art and can take on many arrangements. Data fields 61 are preferably sub-lines, where the bus interface between the master and slave caches can transfer one sub-line of data per cycle. The data stored may be either data operands, instructions, or translation or other system information. Data fields 61 are stored and accessed separately from the remaining fields which are stored in a tag RAM array separate from the data RAM array.

For each cache line in the tag RAM array, address tag 60 stores a tag portion of the address of the data stored in the line. A master valid bit 62 is used to indicate if the line in the master cache 30 contains valid data. A preferred embodiment replaces a single master valid bit 62 with a MESI field of two bits which are encoded to indicate if the line is invalid, modified (dirty), exclusive, or shared with other external caches. The MESI protocol is a well-known protocol for sharing data between different memories or caches. Master valid bit 62 does not provide sub-line validity; only an entire line in master cache 30 can be valid.

Master cache 30 is preferably an 8-way set-associate cache, which is a cache array divided into 8 elements or blocks. A cache line with a certain index can reside in any of the 8 lines (also called set-associates) for the index. The 8 lines are known as a set, and each set is uniquely identified by an index. LRU bits 64 encode a pseudo-least-recently-used algorithm to help select which element or block should be replaced next for that index. An approach for line replacement is to force the set-associates in the master cache that also exist in a slave cache (they have a slave valid bit 66, 68 set) also to be the most-recently-used set-associates.

The master cache line also contains inclusion information for the slave caches 26, 28. SI valid bit 68 indicates that at least some of the data in the master's cache line is also valid in the slave instruction cache, while SD valid bit 66 indicates that at least some of the data in the master's cache line is also valid in the slave data cache. It is possible that only one or two of the four sub-lines may be valid in the slave cache since the slave cache supports sub-line validity. Thus the master cache has information on the contents of the slave caches.

The master cache thus contains three valid bits:
1. The master valid bit 62 which indicates if the line in the master cache is valid.
2. The SI valid bit 68 for the slave instruction cache.
3. The SD valid bit 66 for the slave data cache.

The master cache always contains inclusion information for any lines in the slave caches; it is not permitted for the slave caches to have lines which are not present in the master cache. By also having the slave-cache valid bits, the master cache can perform complex coherency operations, required by many modern architectures such as snoops, invalidations, and zeroing, without needlessly disturbing the slave caches.

Only a valid bit for an entire cache line is provided in the master cache, but sub-line valid bits are provided in the slave caches. Since the master cache is much larger than the slave caches, the additional cost for providing sub-line validity is reduced compared to adding sub-line valid bits in the larger master cache. Details of providing sub-line validity in the slave cache and not in the master cache are provided in the related applications for "Slave Cache having Sub-Line Valid Bits Updated by a Master Cache", U.S. Ser. No. 08/618,637 filed Mar. 19, 1996 with a common inventor and assigned to the same assignee. This related application describes a single combined tag and data pipeline in the master cache for adjusting the sub-line valid bits from the slave caches.

Separate Tag and Data Pipelines in Master Cache

Figure 3:
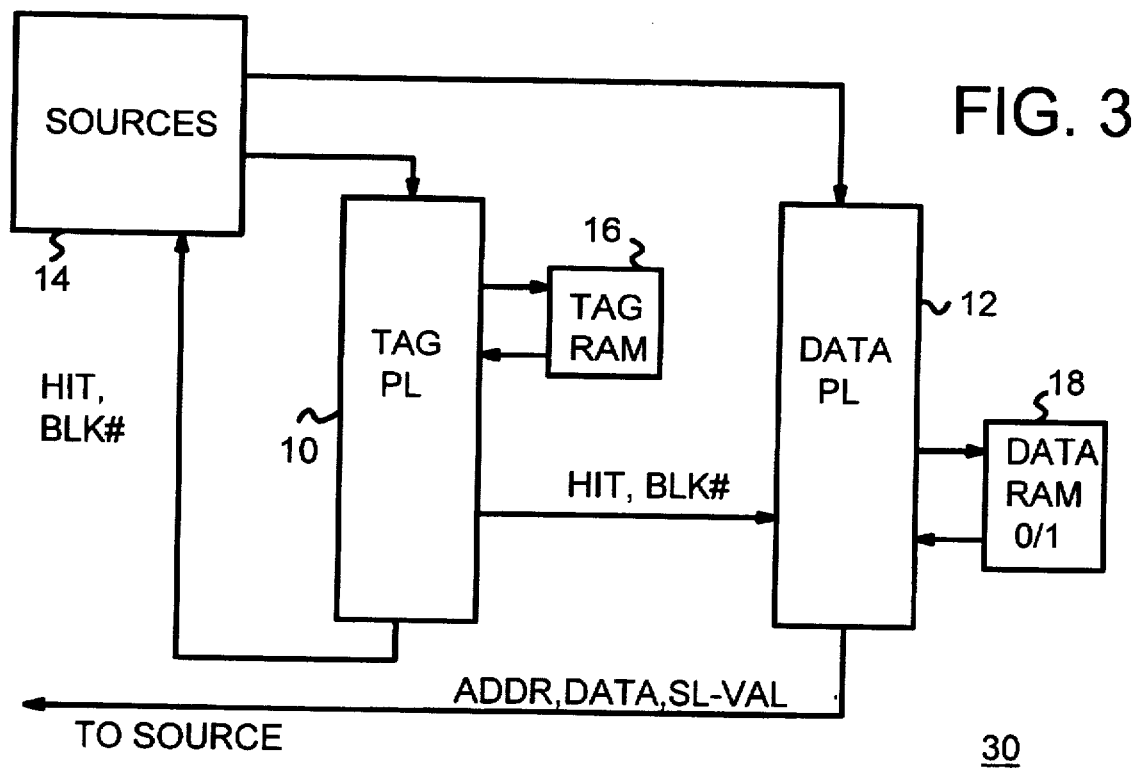
FIG. 3 highlights separate tag and data pipelines in the master cache for separately accessing the tag array and the data array of the master cache.

FIG. 3 highlights separate tag and data pipelines in the master cache for separately accessing the tag RAM and the data RAM of the master cache. Master cache 30 stores data arranged in the sub-lines of data fields in data RAM array 18. Tags, valid bits, and LRU fields are stored in tag RAM array 16. Tag pipeline 10 is a multi-stage pipeline for accessing tag RAM array 16, while data pipeline 12 is a second multi-stage pipeline for accessing data RAM array 18. Tag pipeline 10 is optimized for accessing tag RAM array 16 with minimum latency or access time, while data pipeline 12 is optimized for accessing data RAM array 18 with maximum bandwidth. Thus tag pipeline 10 and data pipeline 12 are separately optimized in timing.

Tag RAM array 16 is set-associative, but all tags for a given index are output to tag pipeline 10 during an access of tag RAM array 16. Tag pipeline 10 includes comparators for each element of tag RAM array 16. These comparators compare the tags stored for an index with the tag portion of the incoming address. When none of the comparators signal a match, or when the master-valid bit or MESI field indicates that the matching address is marked as invalid, then a miss is signaled in tag pipeline 10. When a match is found, and the master-valid bit indicates that the matching line is valid, then a hit is signaled and the element number or identifier for the matching element is encoded by tag pipeline 10.

The hit-miss indication, and the encoded element number for the matching element are sent to data pipeline 12 so that the matching element's data may be selected. Data pipeline 12 can first access data RAM array 18 without knowing which element the desired data resides in, and later in the pipeline select the correct data using the encoded element number from tag pipeline 10. Sending the hit and encoded element number from tag pipeline 10 directly to data pipeline 12 is useful when both pipelines are processing the same address. Both pipelines can process the same address when a source request such as a new miss from a slave cache is simultaneously sent to both pipelines 10, 12. Using both pipelines for the same request is known as 'binding' the two pipelines together and is used for high-priority cache accesses such as a new demand miss from a slave cache which must be quickly responded to so that the CPU can continue. Thus demand misses, which must be satisfied immediately, can use both pipelines in lock-step to maximize resources allocated to the new miss.

Most other sources of requests are not critical for both the tag and data pipelines, so tag pipeline 10 and data pipeline 12 respond to a request at different times. A low-priority line transfer to a slave cache first is loaded into source registers 14, which then arbitrate for control of tag pipeline 10 and/or data pipeline 12. The request is first sent down tag pipeline 10 to read tag RAM array 16 to determine if the line hits in the master cache. If it does, then the hit updates source registers 14, and the encoded element number is also stored in source registers 14. The hit signal sent to data pipeline 12 is either not generated or ignored by data pipeline 12, which may be processing a different source's request.

Once the request in source registers 14 has been looked up by tag pipeline 10 to find the element number of the requested data, then the request arbitrates for control of data pipeline 12. The encoded element number which was found by tag pipeline 10 and stored in source registers 14 is also passed to data pipeline 12. The data is retrieved from the indicated element of data RAM array 18 as the request travels down data pipeline 12. Finally the data and its address are sent to the slave cache from data pipeline 12.

When the data pipeline is not otherwise busy, sending the request down both the tag and the data pipelines can reduce latency in returning the first critical sub-line of a demand miss.

One Tag Access Followed by Four Data Accesses

When multiple sub-lines of data are transferred, then the single pass through tag pipeline 10 may be followed by multiple passes through data pipeline 12, with one sub-line of data being sent to the slave cache for each pass through data pipeline 12. A complete line transfer requires one pass through tag pipeline 10, and four passes through data pipeline 12. A second pass through tag pipeline 10 may be used to update LRU or slave-valid information. A third pass may update slave valid information for the prior contents of the slave cache.

Source Registers Updated as Tags Modified or Read

Source registers 14 contain the address of the request, such as the miss address from the slave cache. Source registers 14 also contain status information about the progress of satisfying the request, such as the hit/miss indication and element number looked up by tag pipeline 10, and the status of external bus operations that are required when the request misses in the master cache and must read an external memory. For a large master cache, many sources can be loaded into many different registers in source registers 14. Source registers 14 contain several registers for miss and prefetch requests for the slave caches, and bus snoop requests, invalidates, stores, and other cache operations.

The inventors have realized that the tags are changed much less frequently than the data. Since four data accesses occur for each tag access for satisfying a typical slave cache miss, more tag bandwidth is available than data pipeline bandwidth. If the tags are modified before all four sub-lines have been transferred to the slave cache, then the source register has its tag-hit indication cleared. The tags must be accessed again or the request canceled altogether when the request's tags are modified by another operation.

When the tags are modified during the tag pipeline, the tag pipeline's address is compared to all sources in the source registers to find any matching index and tag portions of the address. Any matching tags in the sources have their hit indication cleared so that the tags must be accessed again, unless the source register's request has passed a commit point.

Detail of Tag and Data Pipelines

Figure 4:
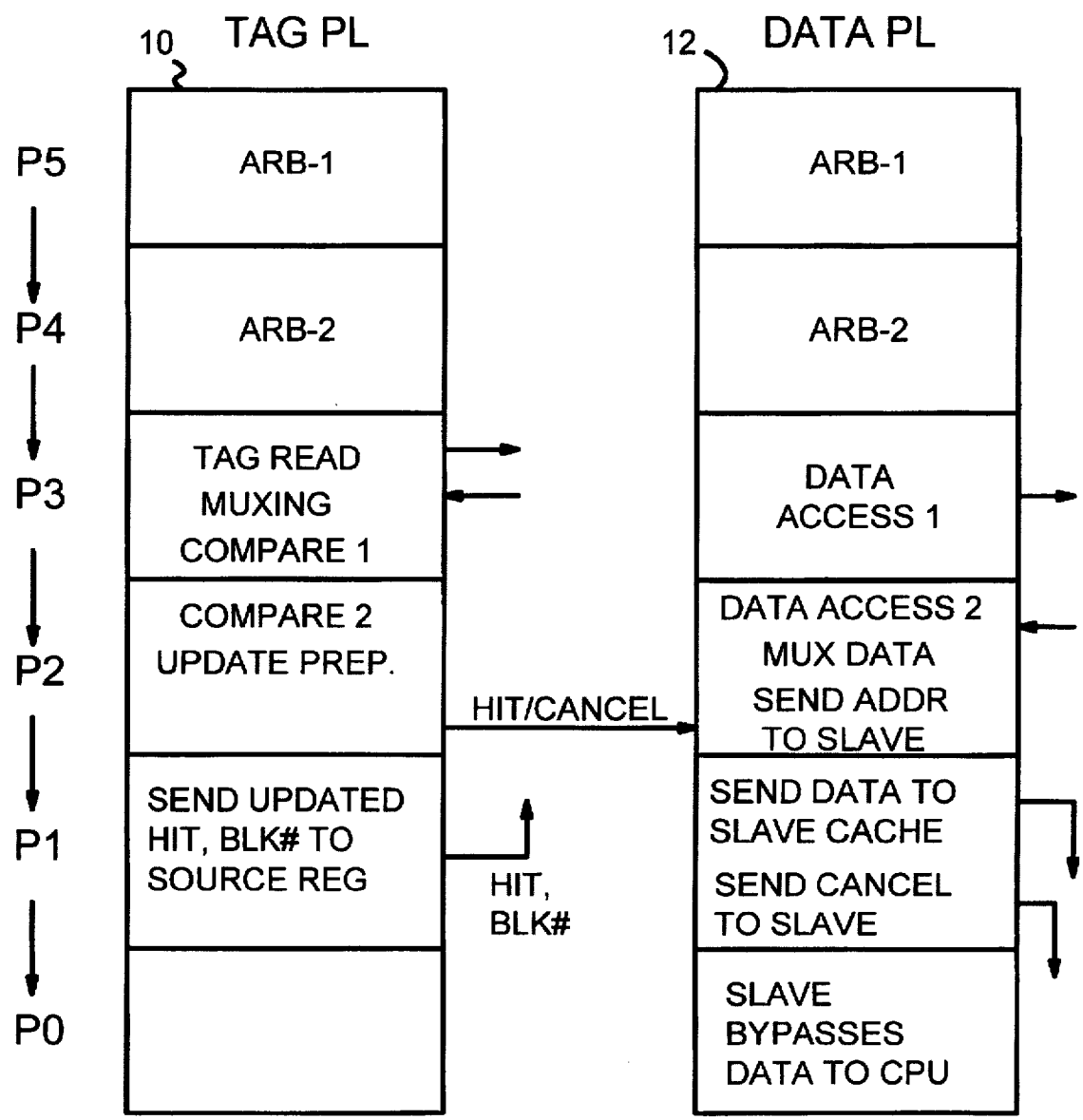
FIG. 4 is a detailed diagram of the stages in the tag and data pipelines.

FIG. 4 is a detailed diagram of the stages in the tag and data pipelines. Tag pipeline 10 accesses the tag RAM array, while data pipeline 12 accesses the data RAM array of master cache 30. Both pipelines contain six pipestages, designated P5, P4, P3, P2, P1, and P0. Stage P5 is the top or beginning of the pipeline while stage P0 is the bottom or end of the pipeline.

Two stages of arbitration (P5 and P4) are used to arbitrate among the many sources of requests for access to the master cache. The first stage (P5), ARB-1, receives lower-priority requests such as background transfers and prefetches to the slave caches which can safely be delayed. The second stage (P4), ARB-2, arbitrates the winner of the ARB-1 arbitration with other high-priority sources. These high priority sources include a new demand miss from a slave cache, which is a request for data that the CPU is waiting for. Another high-priority request is a bus snoop, which often must be responded to within a fixed amount of time. When an exception such as a master-cache miss has occurred in tag pipeline 10, then the excepting request is looped back to ARB-2 and has priority over all other requests. Loop-back allows a request to have several flows through the pipelines to process complex operations, and excludes other requests from accessing or modifying lines at the same cache index as the complex operation.

Separate Arbitration for Tag and Data Pipelines

Separate arbitration is performed for tag pipeline 10 and for data pipeline 12, even when a source requests both pipelines, such as a new demand miss. Separate arbitration allows sources that require only one of the pipelines to request only that pipeline and not the other pipeline. A snoop request which has to read only the tags can arbitrate for only tag pipeline 10 and not for data pipeline 12, which is not needed. Thus separate arbitration promotes efficient use of the pipelines.

Two-stage arbitration provides lower latency for high-priority requests, since these enter the pipeline in the second (P4) stage while low-priority requests enter the first pipeline stage, P5. Thus high-priority requests have one less cycle of latency than do low-priority requests. The presence of a competing requestor and short cycle times may necessitate two-stage arbitration.

Once arbitration is complete, the request address from the source registers is loaded into the P3 stage of the pipeline. Thus the first two stages, P5 and P4, do not require an address. This can further improve latency for requests that receive the address later than the request is signaled. For example, a bus snoop may be initiated when a snoop-request pin is asserted by an external snoop requestor. The snoop address may be driven onto the external bus a cycle or two later. As soon as the snoop-request pin is asserted, but before the snoop address is received, the master cache can begin arbitration for the snoop request in either the P5 or P4 stages, depending on the priority of the snoop request. Likewise a miss from a slave cache can first be signaled before the miss address is sent. The index portion of the address does not have to be available until the beginning of the third pipeline stage, P3, while the remaining portions of the address need to be available only by the end of stage P3.

Tag pipeline 10 is optimized for latency of tag RAM access. Thus the tag RAM array is read early in tag pipeline 10, immediately after arbitration is complete. This provides the hit indication as soon as possible. The tag RAM is read during stage P3 of tag pipeline 10, and the tags, one for each element, are sent to the comparators. Address comparison begins during stage P3 and is completed during the next stage, P2. In P2 the matching element is identified and encoded into the element number, which is sent to stage P2 of the data pipeline when the pipelines are bound together. During stage P2 the hit indication and the encoded element number are sent to source registers 14 for storage.

When the tags need to be written (as for an invalidate), the updated tags, valid bits, and LRU fields are generated during stage P2, and a loop-back flow is performed by re-arbitrating for the tag pipeline in stage P4, and writing to the tags rather than reading the tags during stage P3 of the second flow. Explicit tag-write flows without loop-back occur for line fills from the external bus.

Stage P0, the last pipeline stage, is merely a 'place-keeper' stage performing no function other than for address comparisons against new requests that are being loaded into source registers 14. All new requests have their indexes compared against transfers in the tag and data pipelines so that the new requests can reflect these completing requests that have not yet been sent to the slave caches. In particular, the sub-line valid bits of new requests are adjusted to take into account completing transfers in the P0, P1, P2, and P3 stages of the data pipeline so that all requests are consistent. This allows for transfers to take several cycles to be sent to the master cache or back to the slave caches. In one embodiment the data pipeline has the P0 stage, but the P0 stage is deleted from the tag pipeline.

Data Pipeline

Data pipeline 12 is loaded with the address of the winning request at the beginning of stage P3. This request and its address can be different from the request and address that are loaded into tag pipeline 10. The data RAM array is read during stages P3 and P2, with the address being sent to the data RAM array during stage P3, and the data fields being returned in the next stage, stage P2. Since all data fields are read for all lines having the same index, data pipeline 12 must select the correct element's data by muxing during stage P2. The encoded element number used to select the proper data is staged down data pipeline 12 when tag pipeline 10 is not bound to data pipeline 12. When the two pipelines are bound together, tag pipeline 10 sends the encoded element number to data pipeline 12 late in stage P2 so the correct data can be muxed out.

During stage P1, data pipeline 12 sends the selected data field to the slave cache or other source. Should the two pipelines be bound together and a miss be detected by tag pipeline 10, then the transfer to the slave cache is terminated by sending a cancel signal to the slave cache near the end of stage P1. This cancel signal acts as a disable of the transfer from data pipeline 12 to the slave cache, allowing the address and data fields to be sent at the beginning of stage P1 and the enable/disable at the end of stage P1. Since the wide address and data may require more time to drive the address and data bus interfaces, the cancel signal can be designed to arrive at the slave cache in time to cancel the transfer.

The slave cache can write the data received during stage P0 of the data pipeline. Stage P0 performs no other function other than address comparisons for new requests from the slave cache which arrive before the data from the master's data pipeline 12 is written to the slave cache in stage P0.

Operations which write to the data RAM array include line fills from external memory to the master cache, and stores from the CPU (slave data cache and/or store buffer). Data must be available early in cycle P3 for writing to the data RAM.

New requests that arrive from the slave cache during stages P0, P1, P2, and P3 do not see the data written from these stages. Thus an address comparison is made. When an exact address match is detected, the new request is simply requesting the same data that is being transferred, and thus the new request is redundant. The new request may be deleted rather than being loaded into source registers 14. The new request is known as a 're-miss' and can occur when prefetching correctly anticipates what cache lines are needed. Re-misses also occur when prefetching the remaining sub-lines of a cache line that had only one of the sub-lines requested earlier. When the new address is to a different sub-line but the same cache line as another request in a source register, the new request is merged into the old request's source register.

Re-misses also occur after the new demand miss is transmitted to the master cache, but before all four sub-lines from that cache line have been transmitted to the slave cache. The CPU may request a second sub-line in that cache line. This request for the second sub-line is merged into the original request, but the order of sending the subsequent sub-lines is altered so that the second sub-line requested is sent immediately. Thus merging requests allows sub-lines to be transferred to the slave cache in the order requested by the CPU rather than in a fixed order. Prior art systems might use a fixed order, always sending the third sub-line after the first sub-line, and then the second and fourth sub-lines.

Arbitration and Loop-Back Flows

Figure 5:
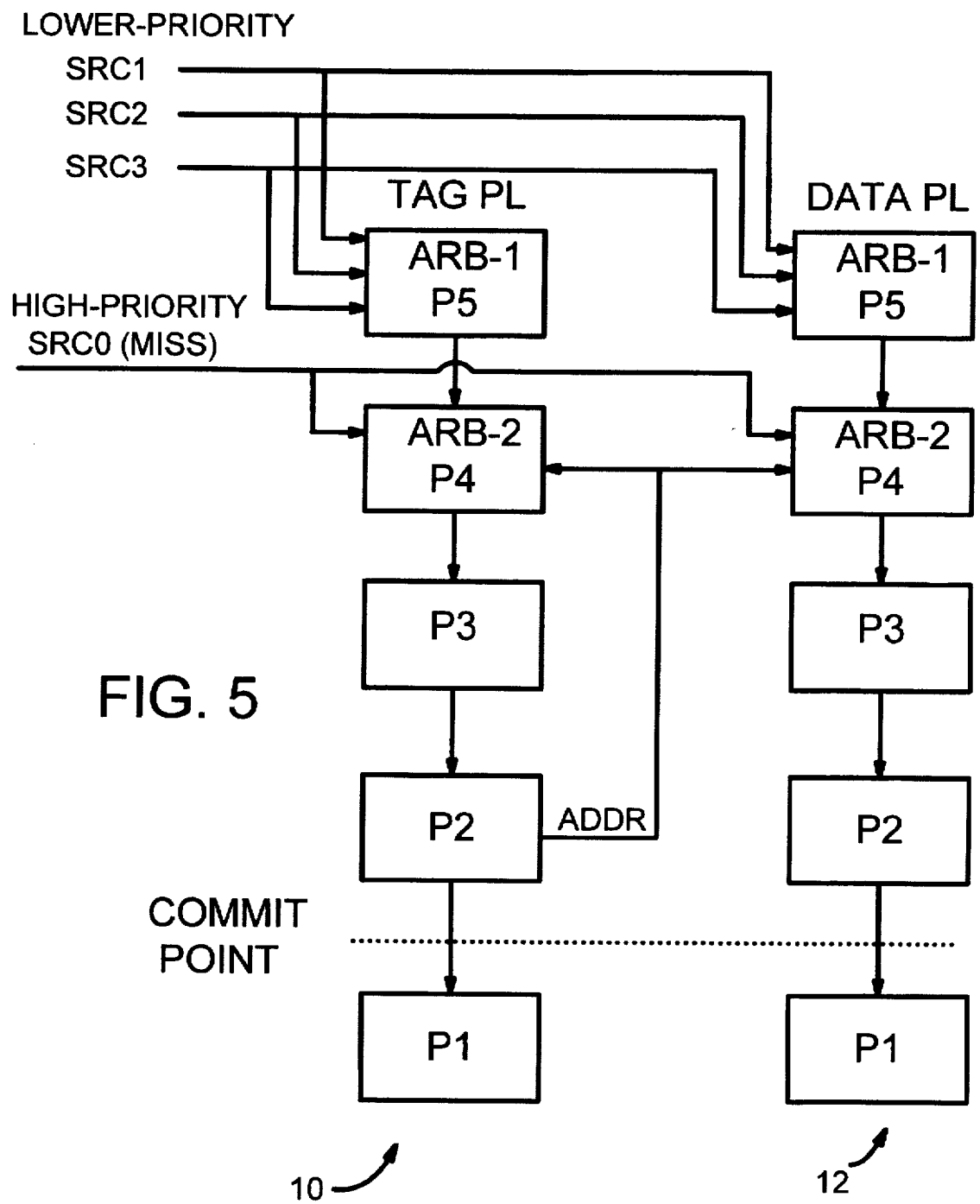
FIG. 5 highlights arbitration and loop-back flows in the tag and data pipeline of the master cache.

FIG. 5 highlights arbitration and loop-back flows in the tag and data pipeline of the master cache. Lower priority sources arbitrate for tag pipeline 10 and for data pipeline 12 in the first stage, P5. Most lower-priority sources arbitrate for either tag pipeline 10 or data pipeline 12, but not both. High-priority sources such as a new demand miss from a slave cache are arbitrated in second stage P4. When there are no high-priority P4 sources arbitrating for a pipeline, then the winner of the first-stage arbitration gains control of the pipeline. However, higher-priority sources input to stage P4 generally win arbitration, losing only to line evicts and fills from the external bus which begin arbitration in stage P5.

The winner of the two-stage arbitration flows down the pipeline through stages P3, P2, P1 and P0. Certain tag-pipeline flows can have exceptional conditions occur. For example, a miss from the slave cache may also miss in the master cache and have to read external memory to find the data requested. Such a miss is detected in the tag pipeline during stage P2, after the tags have been read from the tag RAM array in stage P3 and compared in stages P3 and P2.

When such a miss is detected in stage P2, a second flow is required to read the old tag because the LRU bits must be consulted during the first flow to determine which element is to be replaced. The LRU bits identify which element is to be replaced, and when that element is modified its tag is read during the second flow. The old element's address from the tags read during the second flow are loaded into a source register for line evicts which then arbitrates for the data pipeline. The data pipeline reads the evicted line's data and writes it out to the external bus, perhaps using other buffers.

The second flow through tag pipeline 10 is known as a loop-back flow. A loop-back flow is initiated by arbitrating again for the pipelines. The address from stage P2 is looped back to stage P4 and the flow in P2 arbitrates for a second flow through tag pipeline 10. Data pipeline 12 is also arbitrated for, as it is also needed for some types of loop-back flows. In the preferred embodiment, data pipeline 12 is always bound to tag pipeline 10 for loop-back flows as this simplifies arbitration logic. Since loop-back requests have the highest priority of all requests, the loop-back request from stage P2 always wins arbitration of both pipelines in stage P4.

Both tag pipeline 10 and data pipeline 12 are arbitrated for when a loop-back flow is required. This simplifies loop-backs since both pipelines are often required to handle the exceptional conditions. The preferred embodiment does not allow the tag pipeline to transfer to the slave caches; thus loop-back flows are required to send invalidates to the slave cache from the tag pipeline.

Bus Snoop Which Hits Requires Loop-Back Row

A bus snoop that hits in the tag RAM may require a loop-back flow to invalidate the matching tag. The loop-back flow uses the tag pipeline to write an invalid MESI condition to the master's valid bit/MESI field. At the same time the data pipeline is used to send an invalidate to the slave cache when the matching tag's slave valid bits indicates that the slave cache also has a copy of the data being invalidated. The data pipeline is needed because only the data pipeline can send information to the slave caches. The data pipeline invalidates the slave's data by sending the invalidation address along with all sub-line valid bits cleared. The slave cache blindly writes this address and valid bits to its cache line, resulting in a cache line having all sub-lines marked as invalid.

When the bus snoop hits a modified line in the master cache, then the modified line must be cast out or evicted from the master cache and written out to the bus to update external memory. This eviction of the dirty line requires four passes through the data pipeline to read all four sub-lines of data. A final, optional, tag flow may be initiated to alter the LRU bits to point to the invalidated line so that other valid lines are not replaced before the invalid line. This improves performance somewhat.

Master-Cache Miss Requires Loop-Back Flows

Loop-back flows are also used when a miss from the slave cache also misses in the master cache, and an old cache line must be evicted to make room for the new cache line. If this evicted line is modified, it must be written out to the external memory. During the loop-back, the old tag is read and stored in an evict source register. Subsequent data pipeline flows are used to read the four sub-lines. Finally the tags are over-written for the new line, and the LRU bits are updated in another tag pipeline flow.

A loop-back flow may also be used to update the LRU information. Since the LRU information does not need to be immediately updated, this can also be accomplished by a second flow from the source register rather than by using the loop-back arbitration, which can delay other critical requests.

A loop-back flow is also required when a store from the CPU or store buffer writes to a clean (exclusive) line. During the initial flow through the tag pipeline, the MESI bits are read for the matching cache line. At the P2 stage the tag pipeline determines that the MESI bits show that the cache line is unmodified, and a loop-back flow is arbitrated for in the P4 stage. The loop-back flow then writes the MESI bits to the modified state.

In summary, the loop-back flow occurs when any of the following occur:

1. A miss in the master cache uses the loop-back flow to read the old tag for the modified cache line being replaced, the least-recently-used cache line.
2. A bus snoop uses the loop-back flow to write the tags when a hit occurs in the first flow through the tag pipeline. The matching tag may be invalidated in the loop-back flow. Rather than invalidate the tag, the snoop may change the MESI bits to shared when the data is written out to the bus.
3. A store from the CPU uses the loop-back flow to write the matching tag's MESI bits to modified (dirty) if they were exclusive.
4. Other cache operations from the CPU use the loop-back flow to invalidate a tag.
5. LRU updates use loop-back when too many LRU requests are already queued up.

Address Compare for Intervening Request

Figure 6:
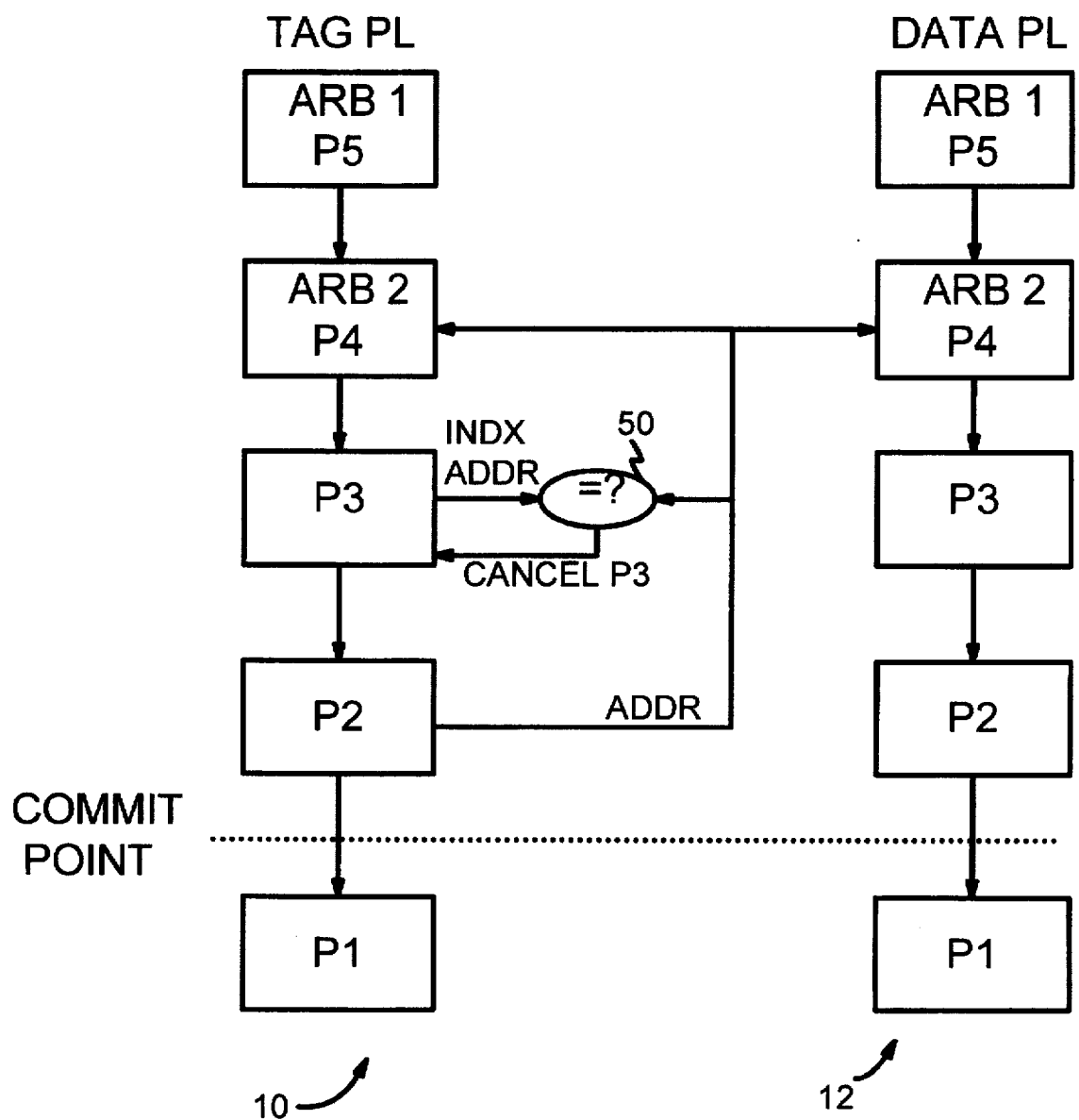
FIG. 6 shows the address for the request in the intervening stage P3 being compared to the loop-back address from stage P2 and the intervening request being canceled when the index portions of the address match.

FIG. 6 shows the address for the request in the intervening stage P3 being compared to the loop-back address from stage P2. The intervening request is canceled for certain loop-back requests when the master-index portions of the address match.

Once a request has flowed down a pipeline into the P1 stage, it has passed the 'commit' point, and an update has occurred. For tag pipeline 10, the source registers 14 are written on the transition from stage P2 to stage P1 with the encoded element number and a bit is set indicating that either a hit or a miss has been detected. For data pipeline 12, the data is sent to the slave cache during stage P1 and source registers 14 are updated to indicate that another sub-line of data has been transferred to the slave cache. A special late cancel signal is used at the end of stage P1 to cancel a transfer if a master-cache miss has just been detected. Otherwise data pipeline 12 reaches its commit point in early P1 rather than at the end of P1. The commit point is at the end of P1 for data pipeline but at the end of P2 for the tag pipeline.

Requests before the commit point can be canceled or looped-back for a second flow through the pipelines. When a request is looped back from stage P2 to stage P4, an intervening request may be present in stage P3 of tag pipeline 10. The master-index portion of the address being looped back is compared to the index portion of the address of the request in stage P3 by comparator 50, and if a match is detected, the request in stage P3 of the tag pipeline may be canceled. This cancels intervening requests that might be affected by the loop-back of P2, but allows requests to unrelated cache lines to complete unhindered.

The comparison for the P3 stage may itself be pipelined for timing reasons. The comparison could take place in the previous P4 stage, with the compare result being available in the P3 stage. The intervening address of the P4 stage is compared to the P3 address in the pipelined compare, which is equivalent to comparing the intervening address in the P3 stage with the P2 address.

Fields in Source Registers

Figure 7:
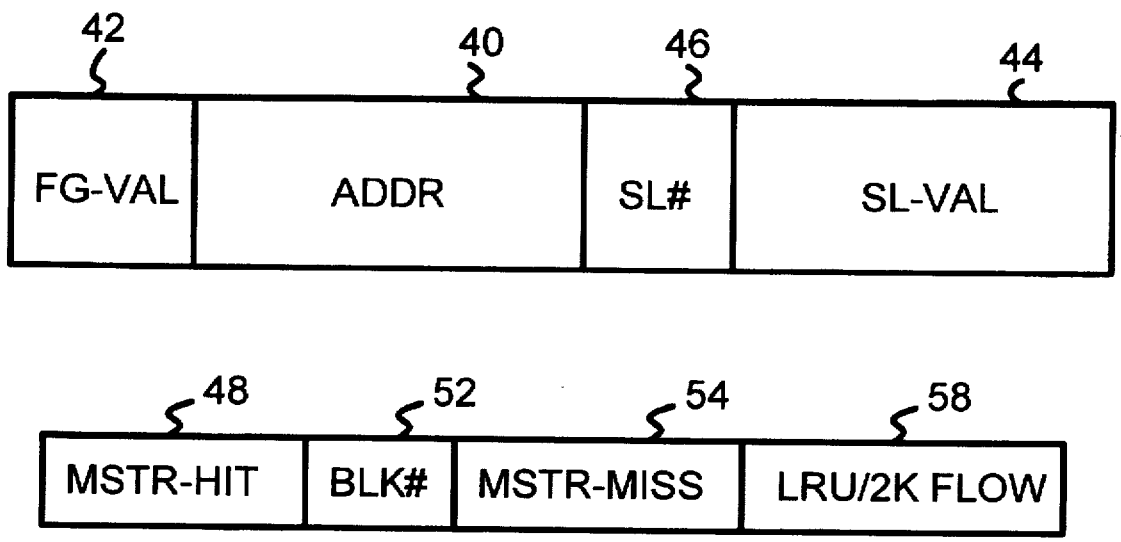
FIG. 7 shows fields in a foreground source register.

FIG. 7 shows fields in a foreground source register. Each source register contains the miss address 40 and other information on the status of the request. For example, sub-line valid bits 44 are stored for misses from the slave cache, and invalid sub-lines may be prefetched to the slave cache when free data-pipeline bandwidth is available. Sub-line valid bits 44 thus indicate how many of the four sub-lines have already been transferred.

Status information is stored when the tag has been looked up, and if so, if a master miss or hit was determined by the tag pipeline. Master hit bit 48 is set after a tag lookup when a hit is detected, while master miss bit 54 is set when the tag lookup detects a miss. The element or block number 52 of the matching tag is also stored from the tag pipeline so that the correct data may be fetched from the data pipeline. Secondary-flow status bits 58 indicate if the LRU update flow has occurred yet, and if any inclusion check or update flows have been processed through the tag pipeline after the data has been fetched.

Foreground valid bit 42 is cleared when no request resides in the foreground register. Demand sub-line field 46 identifies which of the four sub-lines in the cache line is being requested first by the slave cache. Other sources have somewhat similar registers also containing address and status information, but are adapted for other particular types of request.

Types of Source Registers

Several different kinds of source register are used. The slave instruction cache has two source registers: a foreground and a background register. New demand misses are loaded into the foreground register. Sub-lines of data are transferred to the slave cache until another miss from the slave is received. This new request is merged into the foreground register if the miss is to the same line (the index and tag portions of the address match). When the new request is to a different line, the older request in the foreground register is moved to the background register and the foreground register is loaded with the new request. The foreground register transfers its four sub-lines of data to the slave cache before the background register transfers its remaining sub-lines to the slave cache. When both the background and foreground registers are occupied and a new miss arrives, then the request in the background register is deleted to make room for the request from the foreground register.

The slave data cache also has a foreground and a background register used to satisfy slave data cache misses, which operate in the same manner as the foreground and background registers for the slave instruction cache.

The store buffer source register receives all writes from the CPU, which are then loaded into a source register for the store buffer.

Bus snoops also have a source register for checking the tags to determine if the snoop hits in the tags, and to perform an invalidation if a hit occurs. When the hit is to a modified cache line, then the request is transferred from the snoop source register to a bus-operations source register. Bus-operation source registers control transferring data between the master cache and the external bus or external memory. Typically the four sub-lines of data are transferred, and the tags are modified. This requires an initial tag-pipeline flow to read the old tags, four data-pipeline flows to transfer the four sub-lines of data, and a final tag-pipeline flow to write the new tags, or to invalidate the old tag. In the preferred embodiment, four bus-operation source registers are provided to perform up to three bus operations at once and a snoop push. Misses in the master cache also use these bus-operation source registers to read in the new cache line from the external memory, and possibly to evict the old modified line.

Cache operations that are initiated by executing in the CPU a cache operation in the instruction set may also use these bus-operation source registers, or special source registers may be provided. As an example, the PowerPC™ instruction set includes a wealth of cache instructions, such as "touch" instructions (dcbt, dcbtst) that fetch a line from the external memory but do not send any data to the CPU. This is useful to force a pre-fetch of the cache line into the master cache before the data is needed by the CPU. Block-zeroing instructions (dcbz) allocate a new cache line and write zeros to all data fields in the cache line. Other cache operations include "dcbi", which invalidates data in the cache, "icbi" which invalidates instructions in the cache, and "dcbf" which invalidates data after flushing the data if it has been modified.

Types of Operations

The following operations are sent down the tag pipeline:

1. Tag reads for Slave Cache Misses to determine if they hit in the master cache, and which element they hit in.
2. Tag writes from the external bus to update the tags when a new line is allocated to the master cache.
3. Tag reads for stores from the CPU or slave caches to determine if they hit in the master cache and what element they hit in.
4. Tag reads for bus snoops to determine if they hit in the master cache and slave caches.
5. Tag writes by bus snoops to invalidate the master cache's tags, a loop-back flow.
6. Tag writes to update the LRU bits and/or slave valid bits in the master's tags.
7. Tag writes to update MESI bits to modified when a store occurs, a loop-back flow.
8. Tag writes and reads for diagnostic purposes.
9. Inclusion update after replacing a line in the slave, a "2K-away check".

The following operations are sent down the data pipeline:

1. Data reads for slave-cache misses, after the master's tags have been read.
2. Speculative data reads for slave-cache misses while the master's tags are being read.
3. Data writes for stores from the CPU (slave cache and/or store buffer).
4. Data reads for expelling or copying a modified old line from the master cache to the external memory.
5. Data writes from the external bus or memory for loading a new cache line into the master cache.
6. Data reads and writes for diagnostic purposes.
7. Invalidates to the slave caches.

Tag-Only Operations

Several types of operations do not require use of the data pipeline, and thus can occur without reducing the data bandwidth of the master cache. LRU updates, bus snoops, 2K-away inclusion checks, and line-prefetch checking use only the tag pipeline under most circumstances. Bus snoops that must invalidate a line in the slave cache are an exception: the data pipeline is used to transmit the invalidation to the slave cache which requires a loop-back flow. Line-prefetch checking may first be done to determine if a prefetch is feasible before the data bandwidth is used to prefetch data.

When the master cache has more indexes than the slave caches, several sets in the master cache map into one slave set. When a new cache line is loaded into the slave cache, the slave valid bit in the master's tag is set. However, the old slave valid bit for the slave's line being replaced may also need to be cleared. The old slave valid bit is in a different master tag than the new line when the old A20 bit differs from the new miss's A20 bit. Thus an inclusion check may be needed to locate and clear the old line's slave valid bit in the master cache. This inclusion check is performed as a tag-only pipeline flow. This is a lower-priority request. When the slave caches are 2K bytes in size, master cache lines that are 2K bytes away from the new cache line must be checked during this inclusion check. If the master cache has 4K bytes in each block, then only two master cache lines can map to each slave cache line and only one inclusion check may be necessary.

A cache line with four sub-lines uses the data pipeline four times, but the tag pipeline only once or twice. Thus the tag pipeline sits idle for half of the time. This idle time is used for these tag-only operations without impacting data pipeline bandwidth.

Banking Data Rams

The data RAM array may be divided into two or more banks to allow interleaving. Interleaving can increase bandwidth by accessing each bank in a staggered fashion when RAM access requires more than one pipestage. When the source is assigned the data pipeline, one or both of the two RAM banks is also assigned. Both RAM banks may be accessed for demand misses when the tags are being accessed in parallel. The correct bank to use is determined once the tag has been looked up. For subsequent misses in the same line, the tag has already been looked up, and the data pipeline is assigned one of the banks. Back-to-back accesses in the data pipeline can occur when the banks accessed are alternated; otherwise the RAM may be accessed only once every two cycles for a two-cycle RAM access.

The two-stage arbitration is ideal for two banks of data RAM. Since an access to any one bank of data RAM can only be started every other clock cycle, the two-stage arbitration can cancel a request immediately following another request to the same bank and instead allow another request to a different bank to win arbitration. Thus two-stage arbitration promotes efficient interleaving of the two data RAM banks.

For a new demand miss, the first data sub-line is returned in three cycles (stages P3, P2, P1 from receiving the miss in cycle P4). Subsequent sub-lines are returned in three, one, and one additional cycles. Thus a burst of 3-3-1-1 is supported with two-bank interleaving. Below is a timing diagram when the correct bank is selected in the first flow which has the tag and data bound in the pipeline:

| 1st Sub-line: | P4 | P3 | P2 | P1 | | | |
|---|---|---|---|---|---|---|---|
| 1st data | | | | ** | | | |
| 2nd Sub-line: | | | P5 | P4 | P3 | P2 | P1 |
| 2nd data | | | | | | | ** |
| 3rd Sub-line: | | | | P5 | P4 | P3 | P2 | P1 |
| 3rd data | | | | | | | | ** |
| 4th Sub-line: | | | | | P5 | P4 | P3 | P2 | P1 |
| 4th data | | | | | | | | | ** |

The second sub-line does not begin until after the tag has been accessed in P2 of the first flow through the tag pipeline. Alternating banks are selected for each subsequent sub-line. Sub-line validity allows data to be transferred in any order, so that the third sub-line may be transferred before the second sub-line if the second sub-line's bank is busy. This flexibility of ordering sub-lines uses the available RAM banks more efficiently.

Advantages of the Invention

Two independent and parallel pipelines allow separate access of the tag and data RAMs. A higher overall throughput is achieved for a wide variety of cache operations that must be processed by advanced cache systems. While it is possible to optimize access for common line misses and fills, the invention provides optimized access for a wider variety of cache operations, such as bus snoops, invalidates, evicts, stores, and other cache management operations.

The tag pipeline is separately optimized for the timing of the tag RAM array, which may differ from the timing requirements of the data RAM array. The tag pipeline is optimized for latency, providing quick access to the tags, while the data pipeline is optimized for throughput rather than latency. Data transfer throughput is increased while fast tag latency is provided for bus snoops and demand misses.

The pipelines can still be bound together for high priority operations such as returning the first sub-line of data when a new demand miss occurs. The pipelines are then unbound for transfer of subsequent sub-lines, allowing just the data RAM to be accessed for these subsequent sub-lines.

Since the tag RAM array is smaller than the data RAM array for most cache arrangements, the tag RAM has a lower access delay than does the data RAM. The separate pipelines take full advantage of this difference in access delays by reading the tag RAM in less than one clock cycle, but allowing two clock cycles for the data RAM array access.

While pipeline stalls often occur in processor pipelines, tag pipeline 10 and data pipeline 12 are designed to not have any stalls. Instead, when an exceptional condition such as a miss occurs, a request flowing through a pipeline can cancel other requests flowing behind it in the pipeline, and the exceptional request can loop back and flow through the pipeline again to process the exceptional condition. Thus requests always continue to stage down the pipeline unless they are canceled or loop back to the top of the pipeline. Typically a cache clock is used to clock the requests down the pipeline. When no request is being processed by a particular stage, then the stage's outputs are disabled. A stage-valid bit can be used to indicate empty stages.

Except for the hit/cancel signal, tag pipeline 10 and data pipeline 12 are completely decoupled. Even when both pipelines are 'bound' together to simultaneously handle a new demand miss, the only coupling once arbitration is over is the hit/cancel signal and element number from tag pipeline to the data pipeline. After the tag pipeline reads the tag RAM array and determines if the demand miss is a hit in the master cache, tag pipeline 10 sends a hit signal to data pipeline 12. The encoded element number of the matching line is also sent with the hit/cancel signal so that data pipeline 12 can select the correct element's data from the data read out of the data RAM array. Data pipeline 12 reads all elements of data for the index of the new demand-miss, and then selects the correct element's data toward the end of data pipeline 12. Thus almost no coupling between the pipelines is used, allowing the pipelines to act independently of one another.

Alternate Embodiments

Several other embodiments are contemplated by the inventors. For example separate master cache pipelines may be constructed for the slave instruction and slave data caches. Separate pipelines may also be used for each element or group of elements in the master cache. When the RAM is divided into banks, a separate pipeline may be provided for each bank. Requests from other sources besides those described herein can be mixed in with requests for the master pipeline. These other sources can include external snoop or invalidate requests, other processors or I/O devices, stores to the master cache, and other caches. In these cases the 'miss' address is not strictly caused by a miss.

The master cache's pipelines have been described as six-stage pipelines, but deeper or shallower pipelines may also be used. The tag and data pipelines do not have to be of the same length. While for simplicity the requests in the master pipeline have remained in order, some higher-priority requests may bypass lower-priority requests in the pipeline to achieve more efficient processing. Foreground and background registers are just one of many ways to track incoming requests, and indeed these registers or buffers may be deleted in favor of other means of tracking and processing requests. Each foreground or background register may source several transfer requests. A line miss in the foreground register can generate four sub-line requests in order to fetch the entire line into the slave cache. A new request can move an older line miss in the foreground register to the background register, and prefetching may be sourced from these registers by incrementing the line address.

The master cache could also contain a secondary tag RAM array for keeping a copy of the slave's sub-line valid bits and tags to expedite processing. Data forwarding and bypassing techniques may also be used. For example, bus operations which write data from an external bus to the master cache may also forward this data directly to the slave cache during the P2 stage of the data pipeline when writing the data to the data RAM.

In the preferred embodiment, only the data pipeline can transfer information to the slave caches; the tag pipeline must use the data pipeline to send an invalidate to the slave cache even when no data access is required. The tag pipeline could be extended to access the slave caches as does the data pipeline. The tag pipeline may contain additional hardware to latch and stage down the pipeline the tags, valid bits, and LRU information for all elements in a set. This additional hardware can avoid having to perform a loop-back flow to read the old tags for the line being evicted.

The master cache may use a single bus to communicate with both the slave caches. In that case, busses 33, 35 of FIG. 1 are combined together into a single bus. Another improvement is to not store slave valid bits for each of the elements. For an 8-way set-associative master cache storing slave instruction cache and slave data cache valid bits in each set, 16 bits are needed for each index. Instead, a single structure is shared by all sets. The shared structure is known as a use record. The use record encodes the 8 slave instruction cache valid bits into 4 bits: a single slave instruction valid bit, and a 3-bit field that encodes the element number of the one element containing the activated slave instruction cache valid bit. No more than one element may have its data in the slave instruction cache since the slave instruction cache is direct mapped, having only one entry for each master-index. The use record thus reduces the number of bits for the slave valid bits from 16 to 8 for a master having two slave caches. Least-recently-used bits can also be located in the use record.

Other encodings may be used for the fields described herein, and indeed the miss address itself can be decoded at the end of the pipeline to supply the valid bit for the current sub-line. The entire 32-bit address need not be sent to the master cache as all reads are preferably 8 bytes in size. Other address and data sizes may also be used. More tag states beyond MESI may be added without altering the slave caches.

A simplified embodiment is described of a CPU having a single instruction pipeline and a single execution pipeline. However, most modern processors employ super-scalar designs. Super-scalar CPU's have several pipelines. A three-way super-scalar embodiment requires three instructions for each clock period to supply three pipelines. If two of the pipelines are execution pipelines capable of executing memory operations, then two data operands may also need to be supplied for each clock period. The teachings of the detailed description are restricted to a simple CPU having a single execution pipeline and a single instruction pipeline. These teachings may however be extended to multiple pipelines and multiple CPUs by persons skilled in the art.

The arbitration may be accomplished in a single cycle or three or more cycles rather than in two cycles. Tag access may also vary in the number of cycles required. Any number of banks of RAM may be used. Dedicated foreground and background source registers for each slave may be used as taught, or a unified foreground and background register may be used for requests from either slave cache.

The master cache may periodically search for modified lines using spare tag-pipeline cycles. When a modified line is found, it is written out to the external memory, and another tag-pipeline flow performed to change the MESI bits from modified to either exclusive or shared. Writing modified lines out to external memory can improve performance, because when this line needs to be replaced by a new line, the old line no longer has to be written back to external memory.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A master-slave cache system for access by a central processing unit's execution pipelines comprising:

a slave cache for supplying instructions or operands to the CPU's execution pipelines;

a master cache coupled to the slave cache and coupled to an external bus, the master cache organized as an N-way set-associative cache having N elements for each index-portion of an address, the master cache comprising:

a tag RAM array for storing a tag and a master-valid indicator for each element for each index-portion of the address, the tag RAM array including slave-valid indicators for identifying elements in the tag RAM array which also have valid data in the slave cache, the master cache performing cache management operations for the slave cache by using the slave-valid indicators in the master cache;

a data RAM array for storing sub-lines of data for each tag in the tag RAM array;

a tag pipeline for accessing the tag RAM array, the tag pipeline having a plurality of stages for simultaneously processing a plurality of requests by passing the requests through successive stages of the tag pipeline in response to a clock;

a data pipeline for accessing the data RAM array independently of the tag pipeline, the data pipeline having a plurality of stages simultaneously processing a plurality of requests by passing the requests through successive stages of the data pipeline in response to the clock;

tag arbitration means, receiving a plurality of tag requests, for selecting a tag request from the plurality of tag requests for processing by the tag pipeline;

data arbitration means, receiving a plurality of data requests, for selecting a data request from the plurality of data requests for processing by the data pipeline, the data arbitration means operating independently of the tag arbitration means; and source registers, coupled to the tag arbitration means and to the data arbitration means, for storing a plurality of requests for access of the master cache, including requests to access only the tag RAM array, requests to access only the data RAM array, and requests to access both arrays, the source registers storing completion status for each request;

wherein the tag pipeline includes tag update means, coupled to the source registers, for updating the completion status for the request being processed by the tag pipeline;

and wherein the data pipeline includes data update means, coupled to the source registers, for updating the completion status for the request being processed by the data pipeline, whereby the tag RAM array is accessed separately and independently from the data RAM array and whereby separate pipelines are used to access the tag RAM array and the data RAM array.

2. The master-slave cache system of claim 1 wherein the tag pipeline further comprises:

tag compare means, coupled to the tag RAM array, for comparing a tag portion of the address of the tag request to a plurality of N tags for the N elements having an index matching an index portion of the address of the tag request; and hit means, coupled to the tag compare means, for signaling a hit when one of the plurality of N tags matches the tag portion of the address of the tag request;

the tag update means further comprising means for updating the completion status for the tag request with a hit indication when the hit is signaled by the hit means but updating the completion status with a miss indication when no hit is signaled, whereby the source registers are updated with the hit indication or the miss indication after the tag pipeline accesses the tag RAM array.

3. The master-slave cache system of claim 2 wherein the tag pipeline further comprises:

element means, coupled to the tag compare means, for identifying which one of the plurality of N tags for the N elements matches the tag portion of the address of the tag request and outputting an element-hit identifier to the tag update means;

the tag update means writing the element-hit identifier to the tag request in the source registers, whereby the source registers identify which element contains a matching tag after the tag pipeline accesses the tag RAM array.

4. The master-slave cache system of claim 1 wherein the data update means further comprises:

sub-line means for indicating which sub-line of data is being accessed by the data pipeline;

the data update means including means for writing the sub-line means to the completion status for the data request being processed by the data pipeline;

whereby the completion status in the source registers for the data request processed by the data pipeline is updated to indicate which sub-line of data has been accessed.

5. The master-slave cache system of claim 4 wherein the sub-line means comprise sub-line valid bits indicating which sub-lines in a cache line contain valid data, the master cache containing means for writing the sub-line valid bits to the slave cache, whereby the sub-line valid bits generated by the master cache are written to the slave cache.

6. The master-slave cache system of claim 4 wherein the source registers include:

a miss request register for miss requests from the slave cache for CPU requests which miss in the slave cache;

a bus snoop register for bus snoop requests from the external bus, the bus snoop requests including requests to invalidate any matching lines in the master cache, whereby slave-cache misses and bus snoops are requests stored in the source registers.

7. The master-slave cache system of claim 6 wherein the source registers include:

snoop means for generating a tag request in response to a bus snoop received from the external bus;

slave miss means for generating a tag request in response to a slave-cache miss and for generating a plurality of M data requests in response to the slave-cache miss;

wherein each cache line in the master cache contains M sub-lines of data.

8. The master-slave cache system of claim 7 wherein the master cache further comprises:

master miss means, responsive to the miss indication from the tag pipeline, for generating a plurality of M data requests for transferring M sub-lines of data from the external bus to a cache line in the data RAM array in the master cache, whereby M data requests to the data pipeline are generated when a new cache line is fetched from the external bus to the master cache when a master-cache miss occurs.

9. The master-slave cache system of claim 4 wherein the master cache further comprises:

binding means, coupled to the tag arbitration means and coupled to the data arbitration means, for binding the tag pipeline to the data pipeline when a high-priority request is received, the high-priority request arbitrating control of both the tag pipeline and the data pipeline;

whereby both the tag and data pipelines simultaneously process the high-priority request.

10. The master-slave cache system of claim 9 wherein the high-priority request is a first sub-line of data in a new cache-line miss from the slave cache;

wherein subsequent sub-lines of data in the new cache-line miss arbitrate for only the data pipeline and not the tag pipeline, whereby a new miss binds both pipelines together for the first sub-line of data but not for subsequent sub-lines of data.

11. The master-slave cache system of claim 9 wherein the master cache further comprises:

source compare means, coupled to the source registers, for comparing an index and a tag portion of a new request to the index and tag portions of addresses of requests in the source registers;

source merge means, responsive to the source compare means, for merging the new request into an existing request in the source registers when the index and tag portions match;

wherein a subsequent sub-line of data in the existing request arbitrates for only the data pipeline and not the tag pipeline, the subsequent sub-line of data being a sub-line requested by the new request, wherein sub-lines are transferred from the master cache to the slave cache in an order determined by new requests received from the slave cache rather than a fixed order.

12. The master-slave cache system of claim 9 wherein the master cache further comprises:

canceling means, coupled to the binding means, for sending a cancel signal from the tag pipeline to the data pipeline when the pipelines are bound together and the tag pipeline does not signal a hit from the hit means, the cancel signal canceling a transfer from the data RAM array;

wherein the canceling means sends the element-hit identifier to the data pipeline when the pipelines are bound together and the tag pipeline signals a hit, the data pipeline including means for selecting a sub-line of data from the data RAM array in response to the element-hit identifier, whereby the tag pipeline sends the element-hit identifier directly to the data pipeline when the pipelines are bound together and whereby a first sub-line of data is read from the data RAM array in a single flow of the data pipeline bound to the tag pipeline.

13. The master-slave cache system of claim 1 wherein the master cache further comprises:

loop-back means, in the tag pipeline and coupled to the tag arbitration means and the data arbitration means, for arbitrating for a second flow through the tag pipeline and a simultaneous flow through the data pipeline when an exceptional event occurs in the tag pipeline after accessing the tag RAM array, wherein the exceptional event is a master-cache miss, or a bus-snoop hit.

14. The master-slave cache system of claim 13 wherein the second flow invalidates the tag when the exceptional event is the bus-snoop hit, the data pipeline writing invalid sub-line valid bits to the slave cache when the slave-valid indicators in the tag RAM array indicates that a snoop address of the bus snoop also has valid data in the slave cache, whereby the master cache performs a cache management operation for the slave cache by using the slave-valid indicators in the master cache.

15. The master-slave cache system of claim 13 wherein the loop-back means further comprises:

intervening compare means, coupled to the tag pipeline, for comparing addresses of intervening requests in the tag pipeline after the tag arbitration means but before the loop-back means, and for canceling any intervening requests which have an index portion of the address match an index portion of a loop-back request's address, whereby intervening requests in the tag pipeline are canceled when the index portions of the addresses match.

16. The master-slave cache system of claim 1 wherein the slave cache comprises a slave instruction cache for supplying instructions to the CPU and a slave data cache for supplying data operands to the CPU's execution pipeline, the slave instruction cache being read-only by the CPU but the slave data cache being readable and writeable by the CPU.

17. A method for processing a bus snoop from an external bus, the method comprising the steps of:

receiving a snoop address from an external bus, the bus snoop address having a tag portion and an index portion;

loading a snoop source register with the snoop addresses and arbitrating for control of a tag pipeline;

reading a plurality of tags having an index portion of an address matching the index portion of the snoop address;

comparing the plurality of tags to the tag portion of the snoop address;

when none of the plurality of tags match the tag portion of the snoop address, signaling completion of the bus snoop to the external bus and clearing the snoop source register;

when a matching tag in the plurality of tags matches the tag portion of the snoop address:

arbitrating for a loop-back flow in the tag pipeline;

when the matching tag indicates that data is modified and not yet written back to the external bus, performing a series of flows in the data pipeline to transfer data for the matching tag from a master cache to the external bus;

marking the matching tag as invalid during the loop-back flow in the tag pipeline;

when the matching tag indicates that a slave cache coupled to a processor has a copy of the data for a matching line, sending the index portion of the snoop address and an invalid tag to the slave cache to invalidate the matching tag in the slave cache; and signaling completion of the bus snoop to the external bus and clearing the snoop source register, whereby bus snoops are processed by the master cache for the slave cache.

18. The method of claim 17 wherein the step of sending the index portion of the snoop address and an invalid tag to the slave cache to invalidate the matching tag in the slave cache comprises sending from the data pipeline to the slave cache the index portion of the snoop address and the invalid tag, whereby the data pipeline and not the tag pipeline sends the invalid tag to the slave cache.

19. The method of claim 17 further comprising the step of:

when arbitrating for the loop-back flow, comparing the index portion of the snoop address to an index portion of an intervening address, the intervening address being for an intervening request in the tag pipeline before the snoop address;

canceling the intervening request when the index portion of the snoop address matches the index portion of the intervening address, whereby intervening requests in the tag pipeline are canceled when the index portions match.

* * * * *